(12) United States Patent
Smith et al.

(10) Patent No.: US 6,364,981 B1
(45) Date of Patent: Apr. 2, 2002

(54) FORMING AND APPLICATION OF TIRE PLY

(75) Inventors: Michael Wallace Smith, Mogadore; Donald Chester Kubinski, Medina; Bruce Thomas Choate, Wadsworth, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/460,671

(22) Filed: Dec. 14, 1999

(51) Int. Cl.[7] .............................................. B29D 30/30
(52) U.S. Cl. ...................... 156/126; 156/133; 156/134; 156/218; 156/406.2; 156/406.4
(58) Field of Search .................................. 156/133, 134, 156/203, 111, 218, 269, 396, 406.2, 126, 466, 406.4

(56) References Cited

U.S. PATENT DOCUMENTS

| | | | | |
|---|---|---|---|---|
| 1,373,212 A | * | 3/1921 | Tyler et al. ................. | 156/466 |
| 2,732,882 A | * | 1/1956 | Kuts ........................... | 156/203 |
| 2,756,458 A | * | 7/1956 | Krupp et al. ................ | 156/203 |
| 3,143,449 A | | 8/1964 | Bosomworth ............... | 156/126 |
| 3,183,135 A | | 5/1965 | Berquist ..................... | 156/126 |
| 4,283,241 A | | 8/1981 | Hollmann .................... | 156/117 |
| 4,421,499 A | | 12/1983 | Kuipers ....................... | 493/23 |
| 4,484,966 A | | 11/1984 | Kawamoto ................... | 156/126 |
| 4,680,071 A | * | 7/1987 | Candle ......................... | 156/218 |
| 4,813,208 A | | 3/1989 | Piltz et al. .................... | 53/449 |
| 4,877,468 A | | 10/1989 | Siegenthaler ................ | 156/111 |
| 4,987,808 A | | 1/1991 | Sicka et al. ................... | 83/13 |

FOREIGN PATENT DOCUMENTS

EP            0246497 A2 * 11/1987  ................. 156/126

* cited by examiner

Primary Examiner—Geoffrey L. Knable
(74) Attorney, Agent, or Firm—Frederick K. Lacher; Bruce J. Hendricks; The Goodyear Tire & Rubber Company

(57) ABSTRACT

Forming a tubular tire ply from a flat sheet of wire reinforced material, cutting the ply to length and applying the ply to a drum.

3 Claims, 10 Drawing Sheets

FORMING AND APPLICATION OF TIRE PLY

TECHNICAL FIELD

This invention relates to the shaping of a sheet of calendered steel wire ply material into a tubular ply member and transferring the tubular ply member over a mandrel to an anvil, cutting the tubular member with a rotating knife to a required width for a tire ply and transferring the cut length to a tire building drum. Stretching of the ply during application to the drum is avoided and an exact wire count in the ply is provided. Also the desired width of the ply sheet material may be provided by splicing two calendered sheets with the sum of their widths equal to the circumference of the ply material.

BACKGROUND OF THE INVENTION

Providing a wire reinforced tube which is cut to length for application to a tire building drum is shown in U.S. Pat. No. 4,987,808. An extruder is required to form the tubular member by extruding rubber through conduits in a coextrusion head. This is a continuous process and cannot be used with calendered wire reinforced flat sheets. Two tube gripper assemblies are required to support the extruded tube sections as they are transferred and cut to length.

SUMMARY OF INVENTION

The present invention is directed to guiding flat wire reinforced calendered sheet material through shaping rollers where it is shaped into a tube with opposite edges in abutting relation. The edges are spliced to form the tube which is cut to length and transferred to a tire building drum. Different width sheets may be spliced to form a sheet having a width greater than either of the spliced sheets so that a tube of the desired diameter may be obtained.

In accordance with one aspect of the invention there is provided a method of forming a tube of reinforced elastomeric material characterized by shaping a flat sheet of reinforced elastomeric material having a width equal to the circumference of the tube into a tubular shape splicing abutting edges of the sheet and cutting the tube into a predetermined band length for application to a tire building drum.

In accordance with another aspect of the invention there is provided a method of building a tire comprising applying an inner liner to an expandable tire building drum characterized by:

a. shaping a tube from a flat sheet of wire reinforced elastomeric material having a width equal to the circumference of the tube, b. splicing the edges of the flat sheet with the reinforcing wires in the edges being in abutting relation, c. cutting the tube into a tubular member of a predetermined band length, d. transferring the tubular member to a position over the inner liner, and e. applying other tire components over the tubular member.

In accordance with still another aspect of the invention there is provided apparatus for forming a tubular band of reinforced elastomeric material having a predetermined length and diameter from a flat sheet of reinforced elastomeric material, characterized by:

a. a tube former for shaping a flat sheet into a tubular member having a circumference equal to the width of the flat sheet, b. a splicer for splicing abutting edges of the sheet at a splicing position, located downstream of the tube former, c. a cutting apparatus for cutting the tubular member to a predetermined length, located at a cutting position downstream from the splicer;

d. a cylindrical mandrel supporting the tubular member at a position downstream from the splicer as it is being transferred to the cutting apparatus, e. an anvil mounted on said mandrel at said cutting position, and f. a transfer mechanism for gripping the tubular member and moving the tubular member axially of the mandrel.

DETAILED DESCRIPTION OF THE INVENTION

Figure 1:
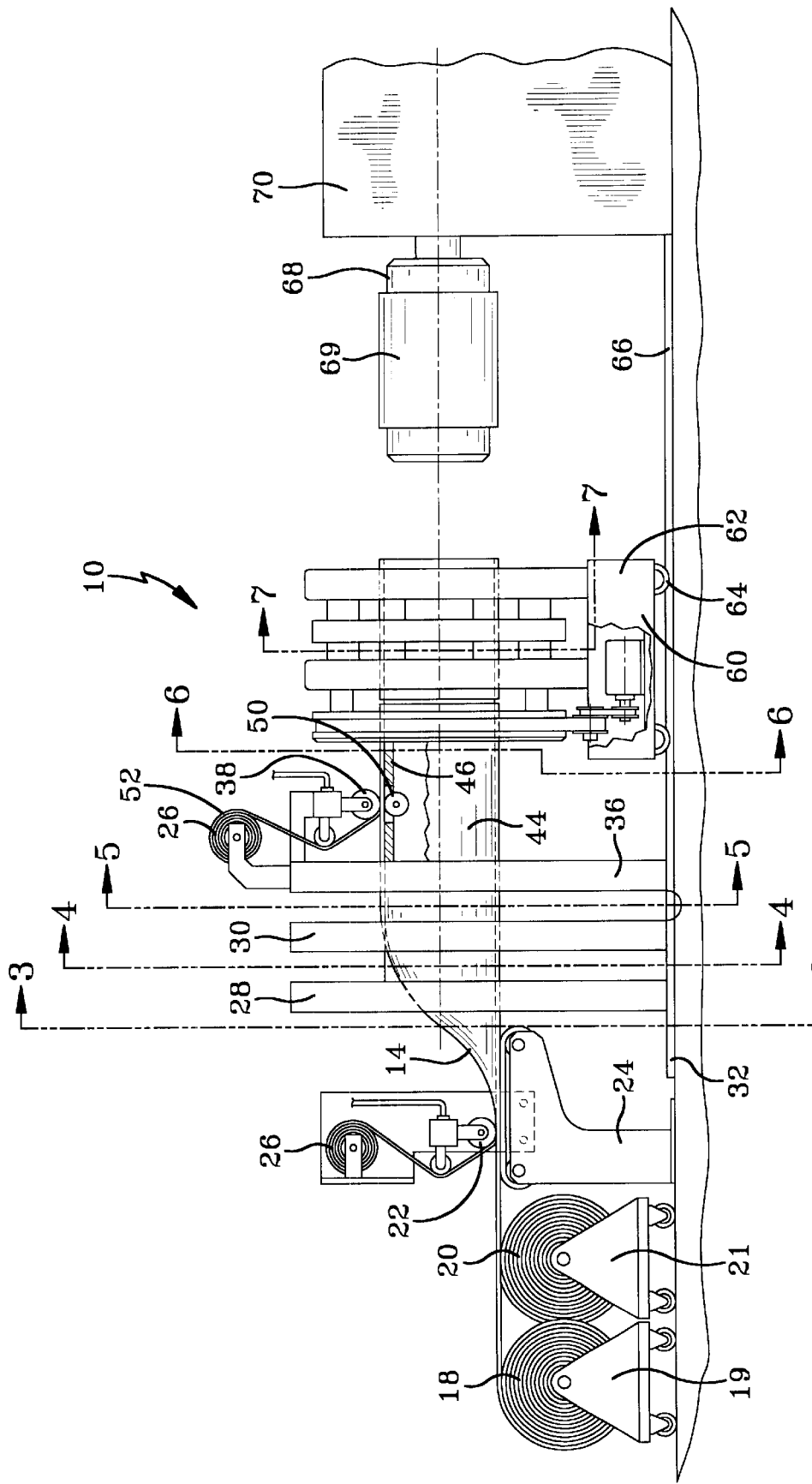
FIG. 1 is a side elevation of an apparatus embodying the invention showing the sheets of calendered wire reinforced material positioned for splicing with a flat edge splicer, a tube shaping apparatus with a tubular splicer and a transfer and cutting apparatus for carrying a spliced tubular reinforced tire component to a cutting position and to a tire building band drum.
Figure 2:
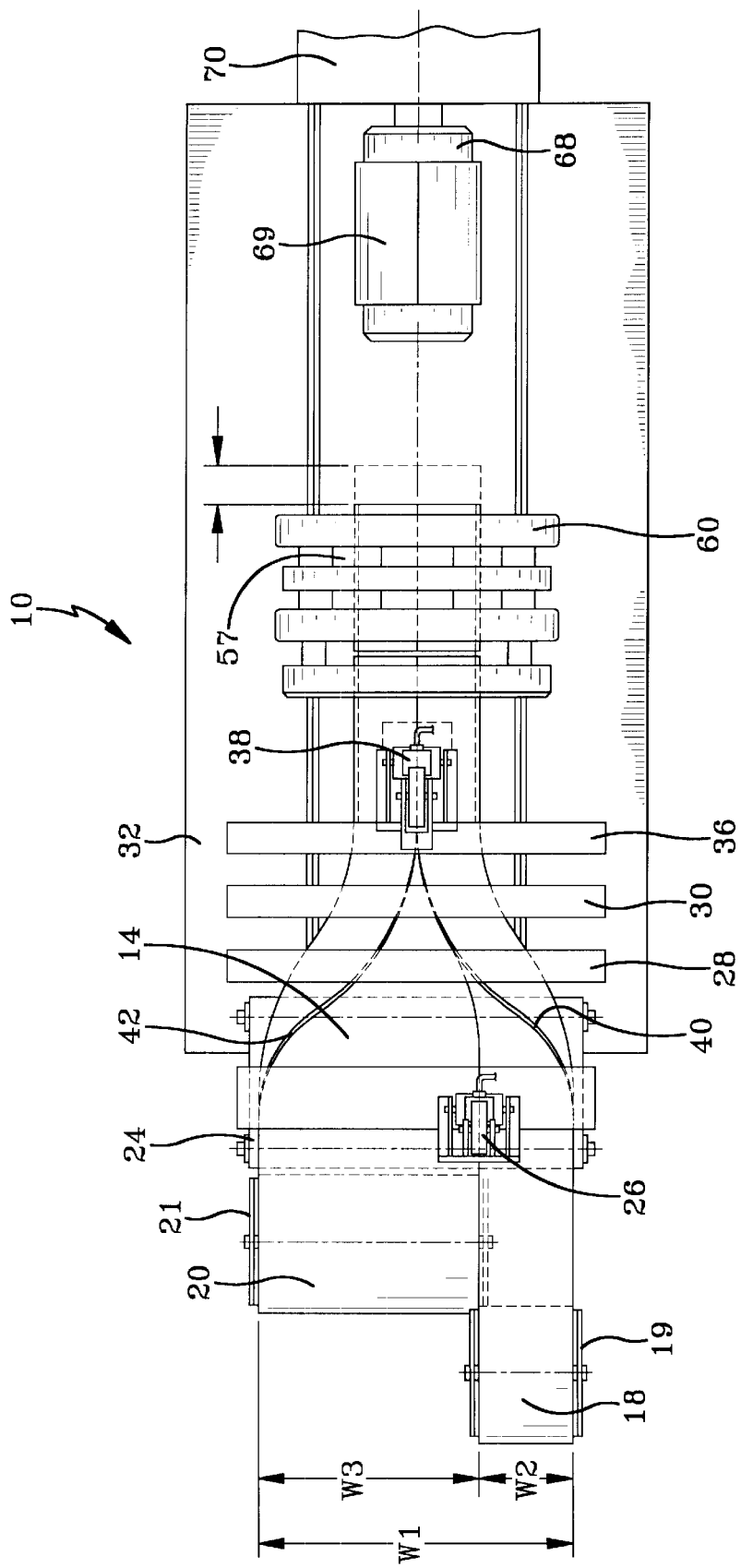
FIG. 2 is a plan view of the apparatus shown in FIG. 1 showing the telescopic end of the mandrel in the extended position.

With reference to FIGS. 1 and 2, a tube forming apparatus 10 is shown for forming a tubular band 12 of reinforced elastomeric material from a flat sheet 14 of wire reinforced rubber ply material of a width W1 equal to the circumference of the tubular band. The sheet 14 may be reinforced by wires 16 extending longitudinally of the sheet.

Figure 3:
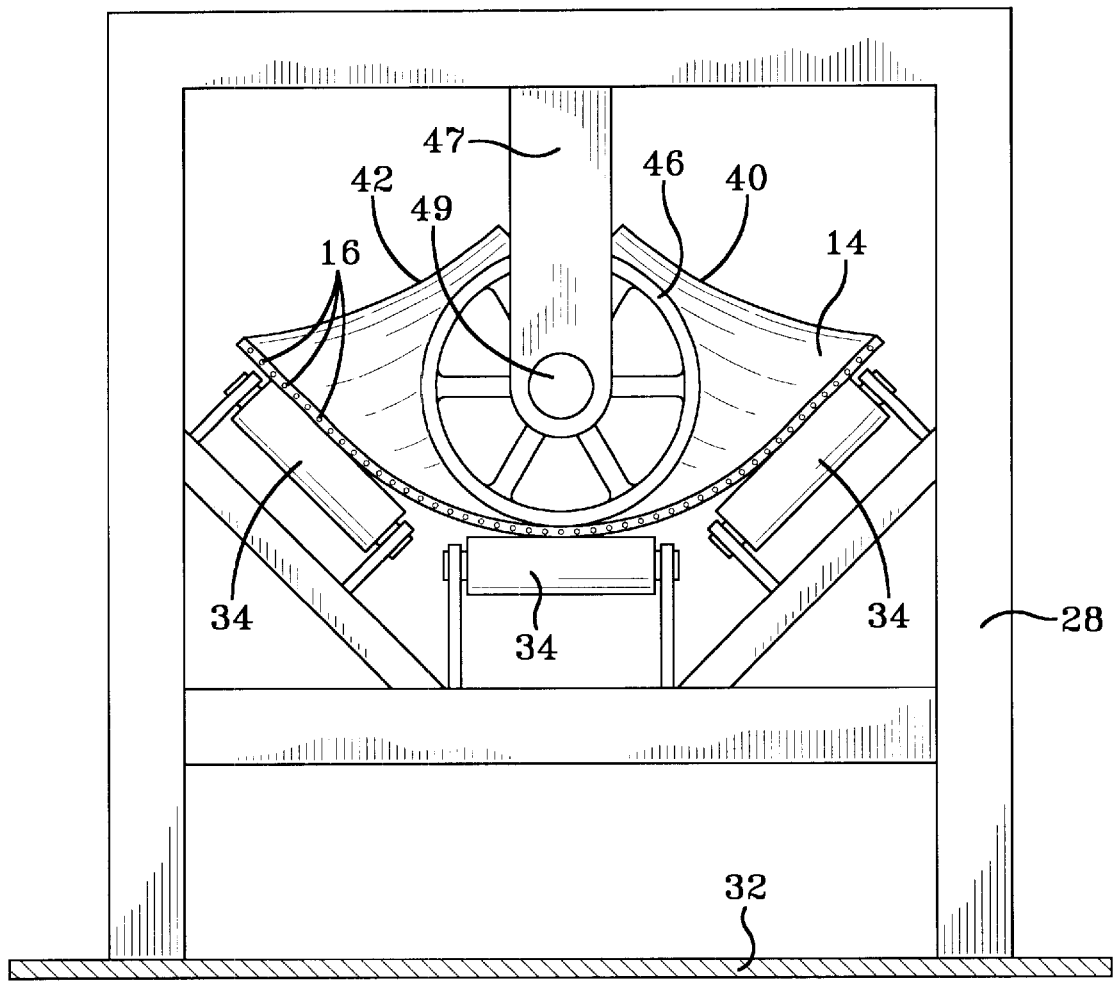
FIG. 3 is a sectional view taken along the plane of line 3—3 in FIG. 1.

As shown in FIG. 1 and 3, the sheet 14 may be prespliced from a first sub flat sheet 18 and a second sub flat sheet 20 having widths of W2 and W3 respectively, by a flat sheet splicer roller 22 mounted on a splicing table 24. A gum strip 26 may be supplied to the splicer roll 22 for making the splice between the edges of the sub flat sheets 18 and 20. The sub flat sheets 18 and 20 may be supplied, from first and second calendered stock sub let offs 19 and 21 which are rolled into position at one end of the tube forming apparatus 10.

Figure 4:
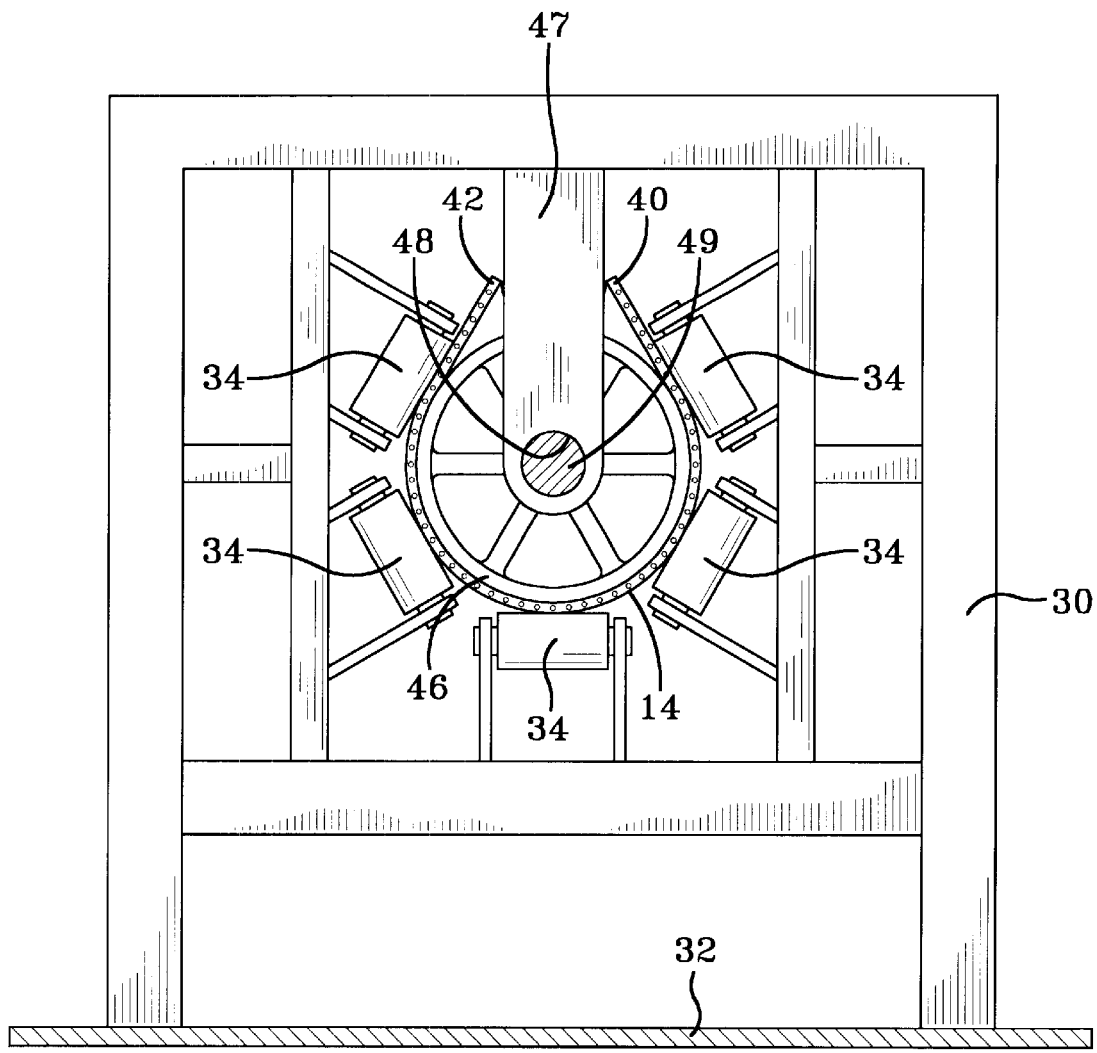
FIG. 4 is a sectional view taken along the plane of line 4—4 in FIG. 1.
Figure 5:
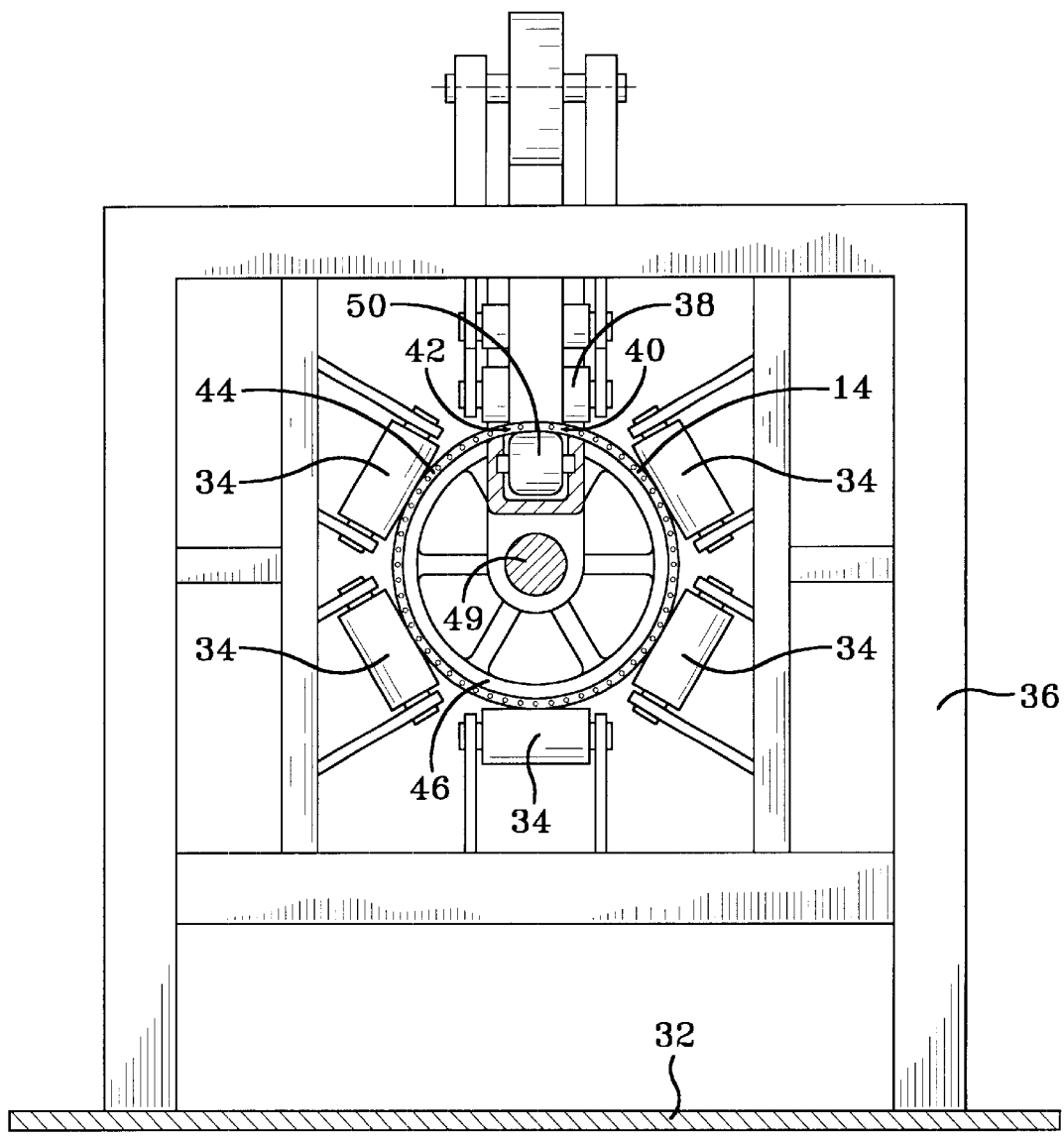
FIG. 5 is a sectional view taken along the plane of line 5—5 in FIG. 1.

As shown in FIGS. 3 and 4, tube forming frames 28 and 30 are mounted on a base member 32 and have support forming rollers 34 for shaping the sheet 14 in a tubular form shown in FIG. 5.

A third tube forming frame 36, shown in FIG. 5, also has forming rolls 34 for providing the tubular shape 14. The third tube forming frame 36 also supports a splicer roll 38 for splicing edges 40 and 42 of the sheet 14 to provide a tube 44.

A mandrel 46 is mounted on a hanger support 47 fastened to the second tube forming frame 30. The hanger support 47 has a bore 48 for supporting a mandrel shaft 49. The mandrel 46 extends downstream to a position under the splicer roll 38 where a mandrel splicer roll 50 is rotatably mounted to cooperate with the third tube forming frame splicer roll 38 for splicing the edges 40 and 42. A gum strip 52 may be supplied to the splicer roll 38 for completing the splice of the edges 40 and 42.

Figure 6:
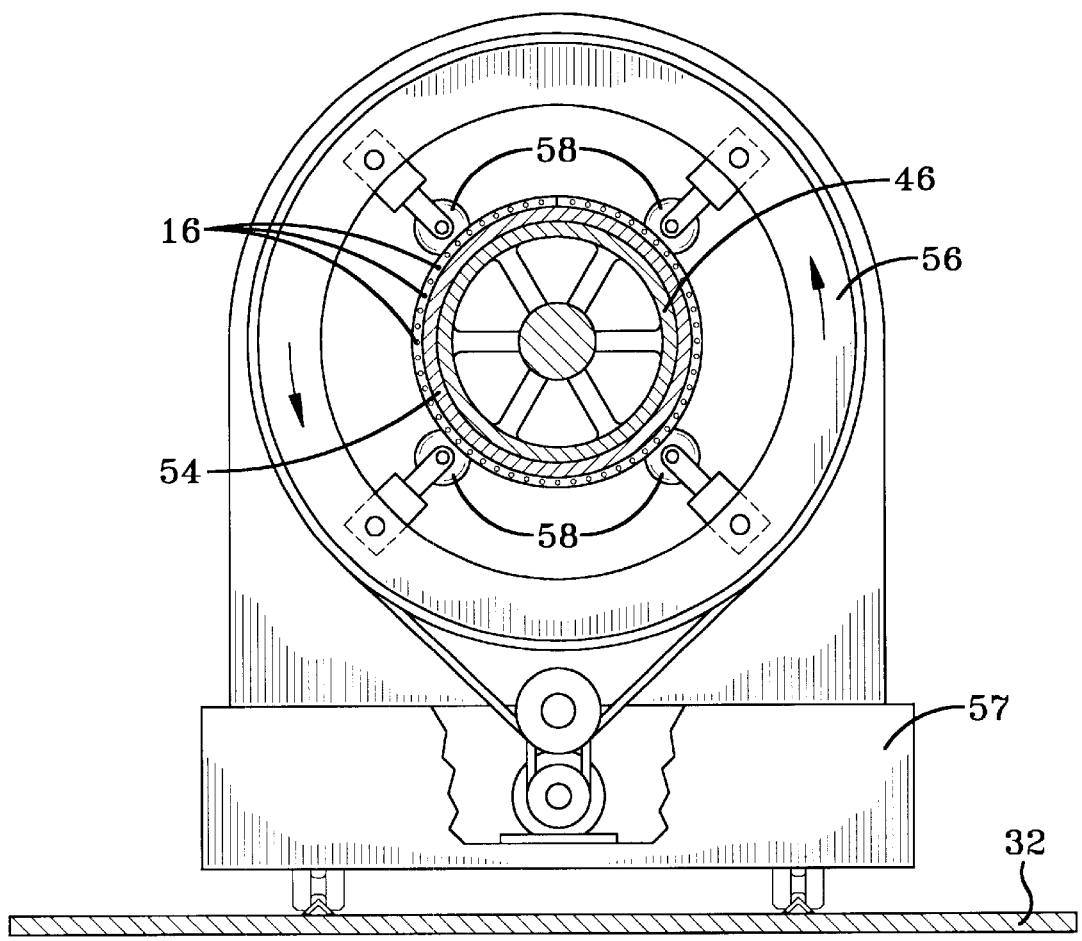
FIG. 6 is a sectional view taken along the plane of line 6—6 in FIG. 1.
Figure 7:
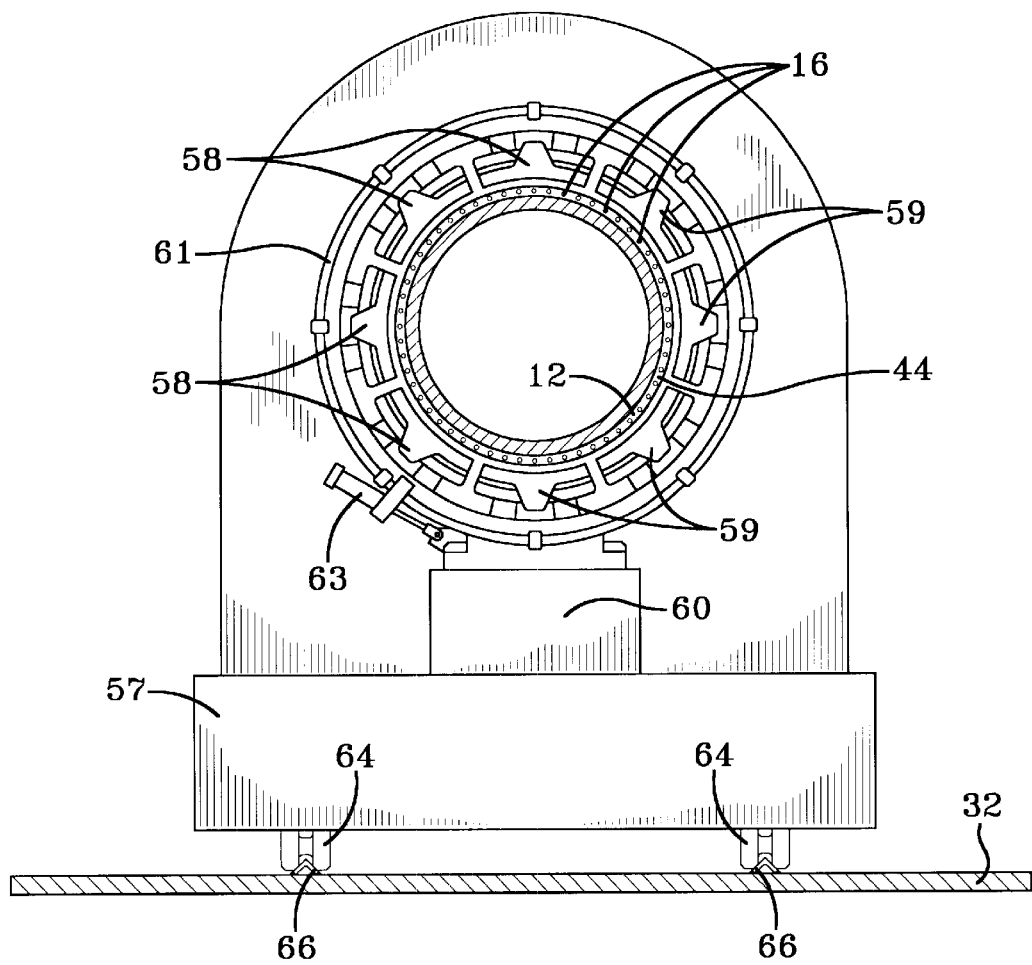
FIG. 7 is a sectional view taken along the plane of line 7—7 in FIG. 1.
Figure 8:
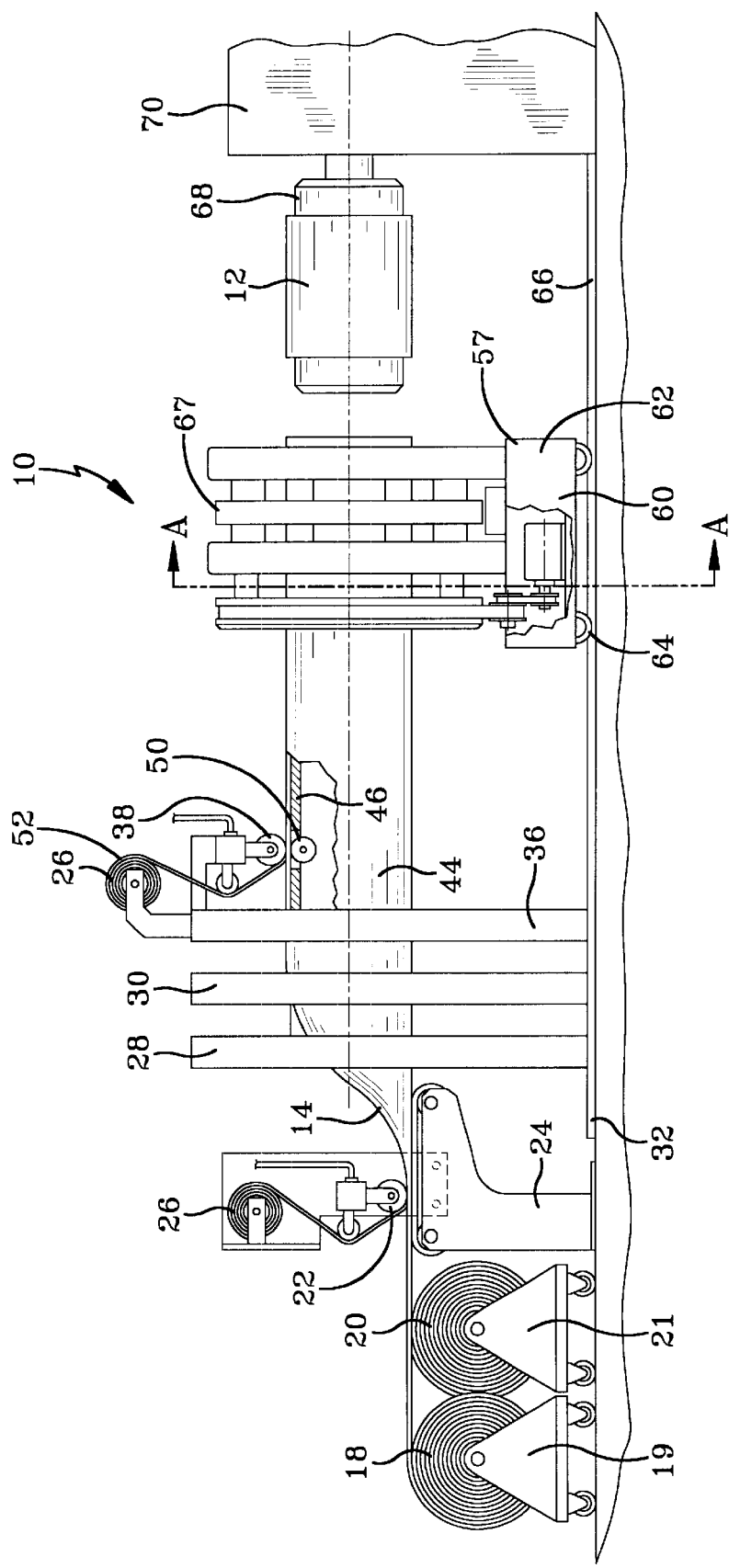
FIG. 8 is an elevation like FIG. 1 showing the apparatus at the tubular reinforced tire component has been transferred to the tire building drum.

Downstream from the splicer rolls 48 and 50, an anvil 54 is mounted on the mandrel 46 for engagement by a rotating cutter 56 having a cutting blade 58 movable into engagement with the anvil for cutting the tube at a predetermined position A—A, shown in FIG. 8. As shown in FIG. 6, the cutter 56 is mounted on a base 57. As shown in FIGS. 1, 2 and 7, the tube 44 is gripped by magnetic shoes 58 of a transfer mechanism 60. The magnetic shoes 58 are slidably mounted for radial movement in response to circumferential movement of a ring 61 actuated by a piston cylinder 63 for rotating the ring. Bars 64 are mounted in positions between the shoes 58 so that when the shoes are retracted, the bars will release the cut tubular band 12 from the shoes. The transfer mechanism 60 is movable on base 57 having wheels 64 supported on rails 66 mounted on the base. As shown in FIG. 7, after cutting the tube 44, the shoes 58 are magnetized and radially contracted to grip the tubular band 12 and are movable with the transfer mechanism 60 to a position over a drum 68 mounted on a housing 70 of a tire building machine. The housing 70 may be rotated or movable to another station for transferring the tubular band 12 to another drum where other components may be added. As shown in FIGS. 1 and 2, an inner liner 69 may be applied to the drum 68 prior to applying the tubular band 12.

In operation the spliced tube 44 is gripped by the shoes 58 of the transfer mechanism and pulled from a position shown in FIG. 1 to a position shown in FIG. 8 where the tubular band 12 is cut to length by the rotating cutter 56. The band 12 is then transferred to the drum 68 by the transfer mechanism 60. The housing 70 may be rotated or movable to another station for transferring the tubular band 12 to another drum where other components may be added. As shown in FIGS. 1 and 2, an inner liner 69 may be applied to the drum 68 prior to applying the tubular band 12. The drum 68 may be expanded and the shoes 58 retracted, positioning the band 12 on the drum as shown in FIG. 8.

Figure 12:
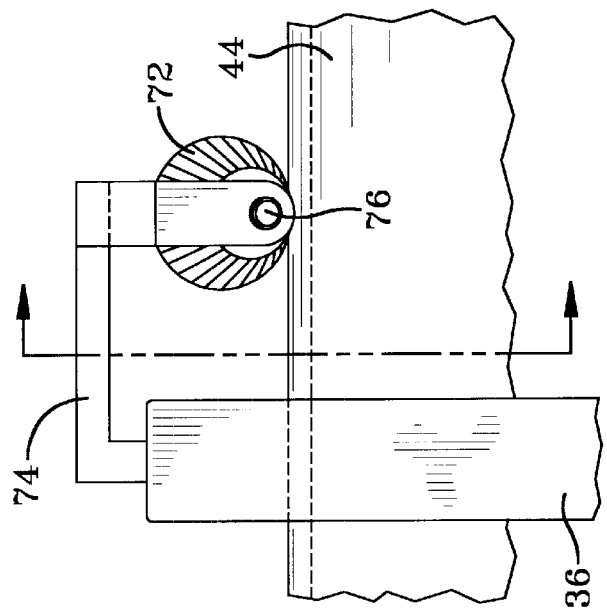
FIG. 12 is a fragmentary elevation of the splicing rolls shown in FIG. 11.
Figure 11:
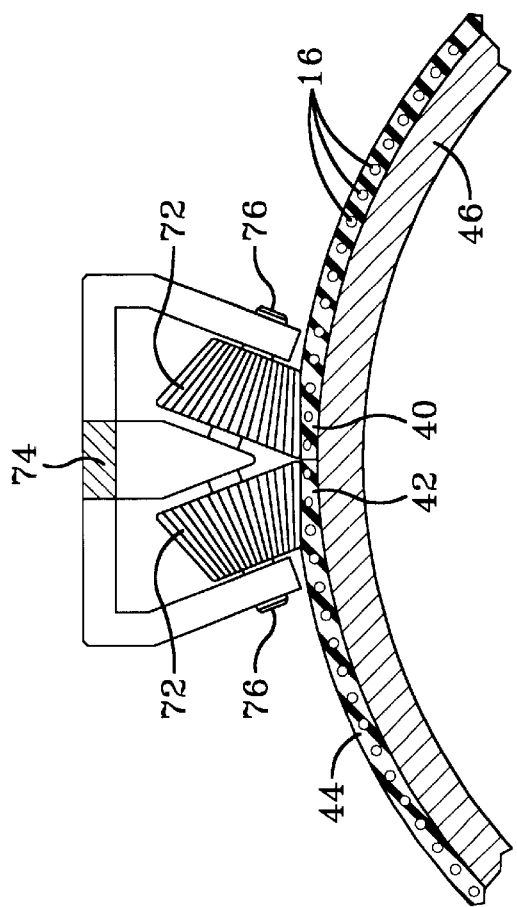
FIG. 11 is a sectional view like FIG. 5 showing alternate splicing rolls.

Referring to FIGS. 11 and 12, alternative splicing rolls 72 are provided in place of splicer roll 38 and mandrel spacer roll 50. The splicing rolls 72 are mounted on an arm 74 attached to the third tube forming frame and supporting shafts 76 for the rolls. Preferably the shafts 76 are converging from a central position over the splice to positions spaced from the splice. Also the rolls 72 each have a frustro conical grooved surface which urges the edges 41 and 42 together. After the tubular band 12 is positioned on the drum 68 the transfer mechanism 60 is moved to the position shown in FIG. 1 where the shoes 58 again grip the tube 44. The transfer mechanism is then moved from the position shown in FIG. 1 to the position shown in FIG. 8 with the rotating cutter 56 adjacent the anvil 54 whereupon the rotating cutter is actuated with the cutters 58 engaging the anvil 54 and cutting the tube to length in the plane of line A—A. The shoes 59 of the transfer mechanism are in engagement with the cut portion of the tubular band 44 providing the tubular band 12 which may then be transferred to the drum 68. In this manner, the flat sheets of reinforcing material 14, 18 and 19 are formed into the tube 44 which is then transferred to a position where the edges 40 and 42 are spliced by the splicing roller 36 and 38. The resulting tube 44 is then gripped by the shoes 59 of the transfer mechanism and moved to a position where the tube is cut to length to provide the tubular band 12. The transfer mechanism 60 then transfers the tubular band 12 to the drum 68 where the drum is expanded to grip the tubular band. The shoes 58 of the transfer mechanism 60 are then retracted and the mechanism moved away from the drum 68. The drum 68 may be moved to another position where the inner liner 69 and tubular band 12 are joined with other tire components to provide a green tire assembly.

Figure 9:
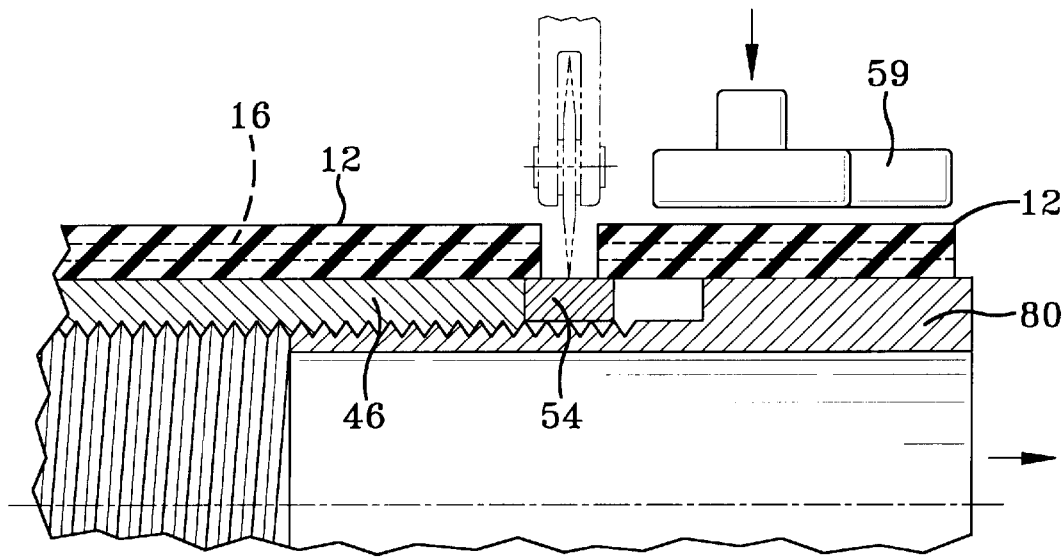
FIG. 9 is a fragmentary sectional view of the telescopic end of the mandrel as shown in FIG. 1.
Figure 10:
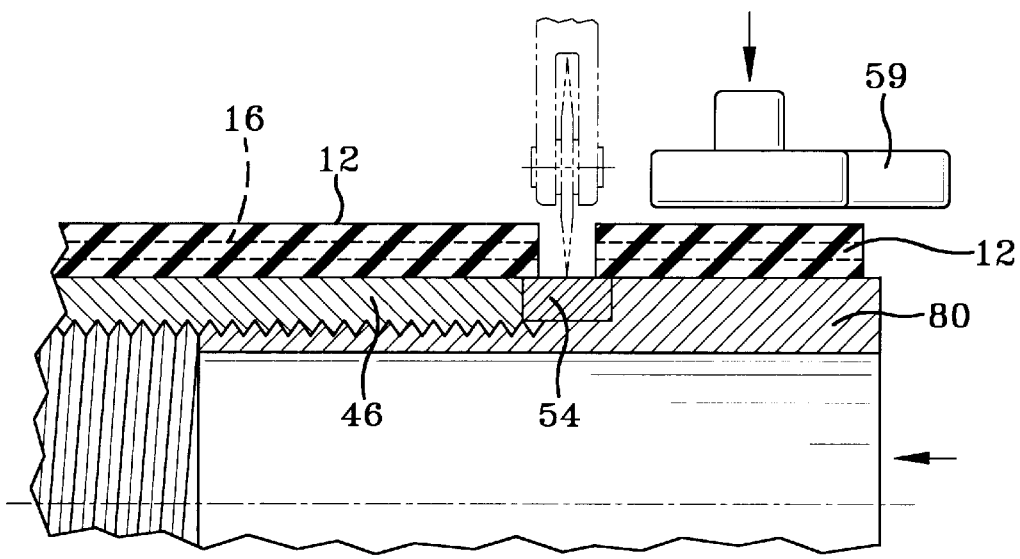
FIG. 10 is a view like FIG. 9 showing the telescopic end of the mandrel in the retracted position.

In the event the width of the tubular band 12 needs to be adjusted an adjustable tubular extension 80 may be threaded into the end of the mandrel 46 a shown in FIGS. 9 and 10. By rotating the extension 80 it may be adjusted axially between an elongated position for wide tubular bands 12 shown in FIG. 9 and narrow tubular bands 12 shown in FIG. 10.

What is claimed is:

1. A method of building a tire comprising forming and cutting to length a tubular band of reinforced elastomeric material for applying to an inner liner on an expandable tire building drum characterized by:

a. shaping a tube from a flat sheet of wire reinforced elastomeric material having a width equal to the circumference of said tube on a mandrel by gripping said tube and moving said tube axially of said mandrel, by a transfer mechanism, b. splicing the edges of said flat sleet with said reinforcing wires in said edges being in abutting relation, c. continuing to grip said tube and transfer said tube a predetermined distance to an anvil mounted on said mandrel, d. cutting said tube into a tubular band of a predetermined band length at said anvil, e. continuing to grip said tubular band and move said tubular band to a position over said inner liner, and f. applying other tire components over said tubular band.

2. The method of claim 1 further characterized by moving said tire building drum from a first position for applying said inner liner to a second position for applying said tubular band.

3. The method of claim 1 further characterized by moving said tire building drum to a third position for applying said other tire components over said tubular band.

* * * * *

UNITED STATES PATENT AND TRADEMARK OFFICE
CERTIFICATE OF CORRECTION

PATENT NO.   : 6,364,981 B1                                                   Page 1 of 1
DATED        : May 6, 2002
INVENTOR(S)  : Smith et al.

It is certified that error appears in the above-identified patent and that said Letters Patent is hereby corrected as shown below:

Column 4,
Line 59, substitute numeral -- 2 -- for numeral "1."

Signed and Sealed this

Tenth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

| | | |
|---|---|---|
| PATENT NO. | : 6,364,981 B1 | Page 1 of 1 |
| APPLICATION NO. | : 09/460671 | |
| DATED | : May 6, 2002 | |
| INVENTOR(S) | : Smith et al. | |

It is certified that error appears in the above-identified patent and that said Letters Patent is hereby corrected as shown below:

Column 4, line 59, substitute numeral --2-- for numeral "1."

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,364,981 B1 | Page 1 of 1 |
| APPLICATION NO. | : 09/460671 | |
| DATED | : April 2, 2002 | |
| INVENTOR(S) | : Smith et al. | |

It is certified that error appears in the above-identified patent and that said Letters Patent is hereby corrected as shown below:

Column 4, line 59, substitute numeral --2-- for numeral "1."

This certificate supersedes Certificates of Correction issued September 10, 2002 and May 1, 2007.

Signed and Sealed this

Fifth Day of June, 2007

JON W. DUDAS
*Director of the United States Patent and Trademark Office*